US008073720B2

(12) United States Patent  
Egner et al.

(10) Patent No.: US 8,073,720 B2  
(45) Date of Patent: Dec. 6, 2011

(54) SYSTEM AND METHOD FOR REDUCTION OF COST OF OWNERSHIP FOR WIRELESS COMMUNICATION NETWORKS

(75) Inventors: Will A. Egner, Allen, TX (US); Wei Yuan, Plano, TX (US); Henry Liu, Dallas, TX (US); Richard Wank, Dallas, TX (US); Peter Griffith, Prosper, TX (US); Dongdong Li, Dallas, TX (US)

(73) Assignee: Cerlon Optimization Services, Inc., Frisco, TX (US)

( * ) Notice: Subject to any disclaimer, the term of this patent is extended or adjusted under 35 U.S.C. 154(b) by 494 days.

(21) Appl. No.: 12/297,428

(22) PCT Filed: Aug. 8, 2006

(86) PCT No.: PCT/US2006/030744  
§ 371 (c)(1),  
(2), (4) Date: Oct. 16, 2008

(87) PCT Pub. No.: WO2007/133234  
PCT Pub. Date: Nov. 22, 2007

(65) Prior Publication Data  
US 2009/0106064 A1 Apr. 23, 2009

Related U.S. Application Data

(60) Provisional application No. 60/792,720, filed on Apr. 18, 2006.

(51) Int. Cl.  
*G06Q 10/00* (2006.01)
(52) U.S. Cl. .................................................. 705/7.11
(58) Field of Classification Search ......................... None  
See application file for complete search history.

(56) References Cited

U.S. PATENT DOCUMENTS

| | | | |
|---|---|---|---|
| 5,787,344 | A | 7/1998 | Scheinert |
| 5,937,042 | A | 8/1999 | Sofman |
| 6,055,433 | A | 4/2000 | Yuan et al. |
| 6,070,090 | A | 5/2000 | Feuerstein |
| 6,208,866 | B1 | 3/2001 | Rouhollahzadeh et al. |
| 6,438,357 | B1 | 8/2002 | Oh et al. |
| 6,463,287 | B1 | 10/2002 | Wegner |

(Continued)

OTHER PUBLICATIONS

"Telcordia's new business model to ignite industry rebound." PR Newswire, Sep. 17, 2003.*

(Continued)

*Primary Examiner* — Rutao Wu  
(74) *Attorney, Agent, or Firm* — Slater & Matsil, L.L.P.

(57) ABSTRACT

Systems and methods to assist wireless telecom service providers to determine the optimal core network evolution plan in a network planning time period. Total cost of ownership of wireless core networks is generally modeled to include capital expenditure, customer acquisition and retention cost, network operational cost and staffing and engineering cost. The total cost of ownership model is used to determine the optimal core network evolution plan at different layers of the core networks, which are modeled as a number of abstract networks in mathematical terms. A core network evolution optimization algorithm determines the optimal number of core network configurations and when to deploy the configurations in the planning period in order to minimize the total cost of ownership. A multi-level serving area optimization algorithm determines an optimal core network configuration at a given point of time.

24 Claims, 8 Drawing Sheets

U.S. PATENT DOCUMENTS

| | | |
|---|---|---|
| 6,539,221 B1 * | 3/2003 | Vasudevan et al. ............ 455/423 |
| 6,618,355 B1 | 9/2003 | Gulliford et al. |
| 7,020,087 B2 | 3/2006 | Steinberg et al. |
| 7,107,224 B1 | 9/2006 | Weller et al. |
| 7,158,790 B1 | 1/2007 | Elliott |
| 7,218,928 B2 | 5/2007 | Park et al. |
| 7,343,334 B1 | 3/2008 | Adduci, Jr. et al. |
| 2002/0069102 A1 | 6/2002 | Vellante et al. |
| 2002/0173313 A1 | 11/2002 | Hutcheson et al. |
| 2003/0083073 A1 | 5/2003 | Cossins et al. |
| 2003/0158765 A1 | 8/2003 | Ngi et al. |
| 2004/0214577 A1 | 10/2004 | Borst et al. |
| 2005/0097161 A1 | 5/2005 | Chiou et al. |
| 2005/0132027 A1 * | 6/2005 | Vicente et al. ................ 709/220 |
| 2005/0177629 A1 | 8/2005 | Betge-Brezetz et al. |
| 2005/0202811 A1 | 9/2005 | Abed et al. |
| 2006/0077900 A1 | 4/2006 | Carello et al. |
| 2006/0262730 A1 | 11/2006 | Fournigault et al. |
| 2008/0109731 A1 | 5/2008 | Chang et al. |
| 2009/0106064 A1 | 4/2009 | Egner et al. |
| 2009/0274067 A1 * | 11/2009 | Zolfaghari .................... 370/254 |

OTHER PUBLICATIONS

Apostolopoulos, T.K., et al., "Information Technology Investment Evaluation: Investments in Telecommunication Infrastructure," International Journal of Information Management, vol. 17, No. 4, pp. 287-296, 1997.

* cited by examiner

Lost Service Revenu

Capture service revenue with worst case cost

Introduce configurations to reduce total cost while still capture service revenue Optimal network evolution path established when no more configuration is needed

SYSTEM AND METHOD FOR REDUCTION OF COST OF OWNERSHIP FOR WIRELESS COMMUNICATION NETWORKS

RELATED APPLICATION DATA

This application is a national filing under 35 U.S.C. §371 of International Application No. PCT/US2006/30744, filed in Aug. 8, 2006, which application claims priority to and the benefit of U.S. Provisional Application No. 60/792,720, filed on Apr. 18, 2006, entitled "Cost Reducing Techniques for Wireless Communication Networks," which application is hereby incorporated herein by reference.

TECHNICAL FIELD

The present invention relates generally to wireless networks and, more particularly, to a system and method for reduction of cost of ownership for wireless communication networks.

BACKGROUND

The wireless telecommunications industry has been experiencing a tremendous growth and an important transition period in the past few years and, as a result, is often characterized by fierce competition between wireless service providers. In an attempt to increase revenues and profits, it is generally important for the service providers to provide better services with lower costs.

A wireless telecommunication network consists of a wireless access network and a wireless core network. The wireless access network allows subscribers access to the network through its Radio Frequency (RF) equipment so that telecommunication services can be delivered to subscribers. Wireless core networks generally provide the network functionalities other than RF to subscribers, including mobility management, voice call management, packet session management, and transport for voice and data traffic.

FIG. 1 illustrates a GSM/GPRS network 100. Wireless networks of other technologies are similar to the one shown in FIG. 1. As shown in FIG. 1, different types of core network elements, such as BSCs 110, MSCs 112, GMSCs 114, SGSNs 116, and GGSNs 118, work together with RF equipment at Base Transceiver Stations (BTSs) 120 to provide telecommunication services to subscribers. In a typical wireless network, there are a number of BTSs with RF equipment for providing wireless network access to subscribers. A BTS provides RF coverage of a certain geographic area where subscribers' Mobile Stations (MSs) are able to place and receive telephone calls and packet data (e.g., emails).

When a subscriber places or receives a voice call in the coverage area of a BTS, the wireless network establishes a wireless connection between the subscriber's MS and the BTS. If the subscriber moves around, the subscriber may leave the coverage area of the BTS, and enter the coverage area of another BTS. In this case the wireless network performs a procedure called handover, where the first BTS hands over the subscriber's voice call to the second BTS. Due to the mobility of mobile subscribers, there are a number of handovers between adjacent BTSs, especially in those heavy mobility areas.

BTSs are controlled by a type of core network equipment, named Base Station Controller (BSC). BSCs provide mobility management functionality to the network. A BSC has a parent-to-child (one-to-multiple) relationship to the BTSs that it controls. BTSs controlled by a BSC form the serving area of the BSC. BSCs are connected to a type of core network equipment, called a Mobile Switching Center (MSC). MSCs provide voice call processing and switching functionality to subscribers. An MSC has a parent-to-child (one-to-multiple) relationship to the BSCs to which it is connected. The BSCs connected to an MSC form the serving area of the MSC.

BSCs are also connected to another type of core network equipment, called a Serving GPRS Support Node (SGSN). SGSNs process packet data traffic, and provide mobility management and packet data services to subscribers. An SGSN has a parent-to-child (one-to-multiple) relationship to the BSCs to which it is connected. The BSCs connected to an MSC form the serving area of the SGSN.

A Home Location Register (HLR) is a database storing subscriber profiles and locations in terms of MSC serving areas. A Gateway MSC (GMSC) provides gateway functionality between wireless networks and the wired network Public Switching Telephony Network (PSTN). A Gateway GSN (GGSN) provides gateway functionality between wireless networks and fixed data networks (e.g., the Internet). Network elements in a typical wireless network as illustrated in FIG. 1 are connected through different types of transport facilities, such as T1s, T3s, OC-3, OC-12, and OC-48.

A network configuration refers to a particular parent-to-child connectivity between different types of network equipment at different levels, such as BSC-to-BTS relationships, MSC-to-BSC relationships, SGSN-to-BSC relationships, and so forth. When those relationships are changed, it is considered that the network is evolved to a new network configuration.

As the number of subscribers grows, more network equipment needs to be deployed for accommodating the forecasted network traffic. In a GSM/GPRS network, for example, additional BTSs may be planned to be introduced, and the traffic on the existing BTSs may also grow. As a consequence, additional core network equipment, such as BSCs, MSCs, and SGSNs, needs to be deployed. The BTS-to-BSC, BSC-to-MSC, and BSC-to-SGSN parenting relationships need to be adjusted so that the capacity of the core network equipment is utilized to its maximum level and the network is maintained at a high performance level. Maximum network capacity with additional equipment is achieved by balancing the equipment load across the network through serving area adjustments. The serving areas of the BSCs, MSCs and SGSNs in the network are adjusted through network element re-homes, which are the re-assigning of those network nodes to different parenting equipment.

Preferred embodiments of the present invention provide methods and systems for minimizing the total cost of ownership for wireless core networks while maintaining high network performance. In other words, preferred embodiments of the invention minimize the total cost of deploying, operating and maintaining a wireless core network. These methods and systems generally model wireless core networks, analyze the total cost of maintaining the networks, and provide an optimal network configuration with lowest total cost of ownership while guaranteeing high network performance.

Preferred embodiments of the present invention provide a mathematical model for calculating the total cost of ownership of a wireless core network for a given time period. The model reflects the different types of cost for owning a wireless core network, including network equipment cost, customer acquisition and retention cost, facility leasing cost, and network engineering cost. The model also characterizes the total cost of ownership as the core network evolves over time to cope with subscriber growth and mobility pattern changes.

Preferred embodiments of the present invention provide methods and systems for minimizing the total cost of ownership for wireless core networks. A multi-level server area optimization algorithm is applied to different types of wireless core networks, such as GSM, GPRS, CDMA and UMTS, for determining optimal equipment serving areas which result in the lowest total cost of owning a core network at any given time. A recursive algorithm is defined to optimize sequencing of the network configuration that minimizes total cost over time across the network planning horizon.

It should be appreciated by those skilled in the art that the conception and specific embodiment disclosed may be readily utilized as a basis for modifying or designing other system or methods for carrying out the same purposes of preferred embodiments of the present invention. It should also be realized by those skilled in the art that such equivalent systems and methods do not depart from the spirit and scope of preferred embodiments of the invention as set forth in the appended claims.

BRIEF DESCRIPTION OF THE DRAWINGS

The object and other advantages of preferred embodiments of the invention are best described in the preferred embodiment with reference to the attached drawings that include.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

One skilled in the art will appreciate that embodiments of the present invention may be used by wireless service providers to model the total cost of their core networks as opposed to the typical method of modeling only the equipment cost of the core network. Embodiments of the present invention model the total cost of ownership metric to include core network equipment cost, operational cost such as transport facility leasing, cost of customer acquisition and retention (CAR), reflecting the network performance, and the network engineering cost for network evolution. The cost may be calculated using Net Present Value (NPV) or may be calculated as an annualized payment. Alternatively, core network cost may be modeled to include a combination of one or more of total cost of ownership, core network configuration cost, monthly equipment cost, and monthly CAR cost.

Figure 1:
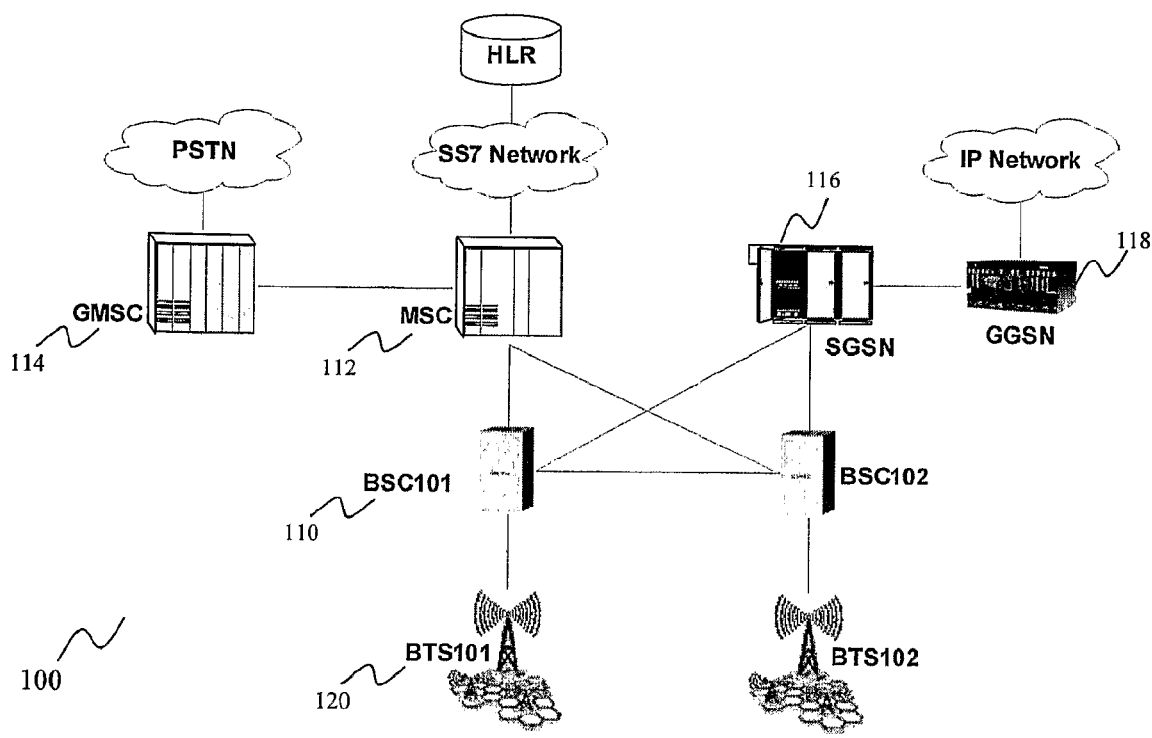
FIG. 1 is a network diagram of a typical wireless telecommunication network.
Figure 2:
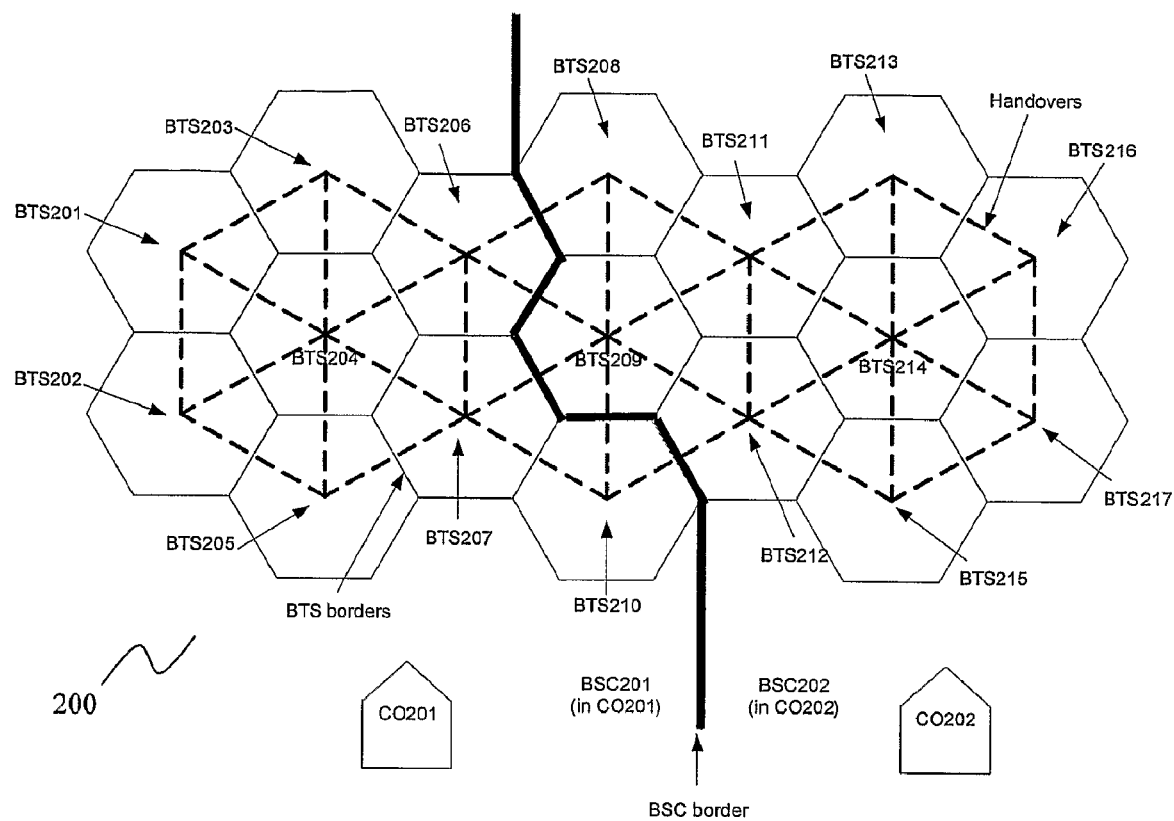
FIGS. 2 and 3 are network diagrams showing changes to a wireless network when deploying additional core network equipment.
Figure 3:
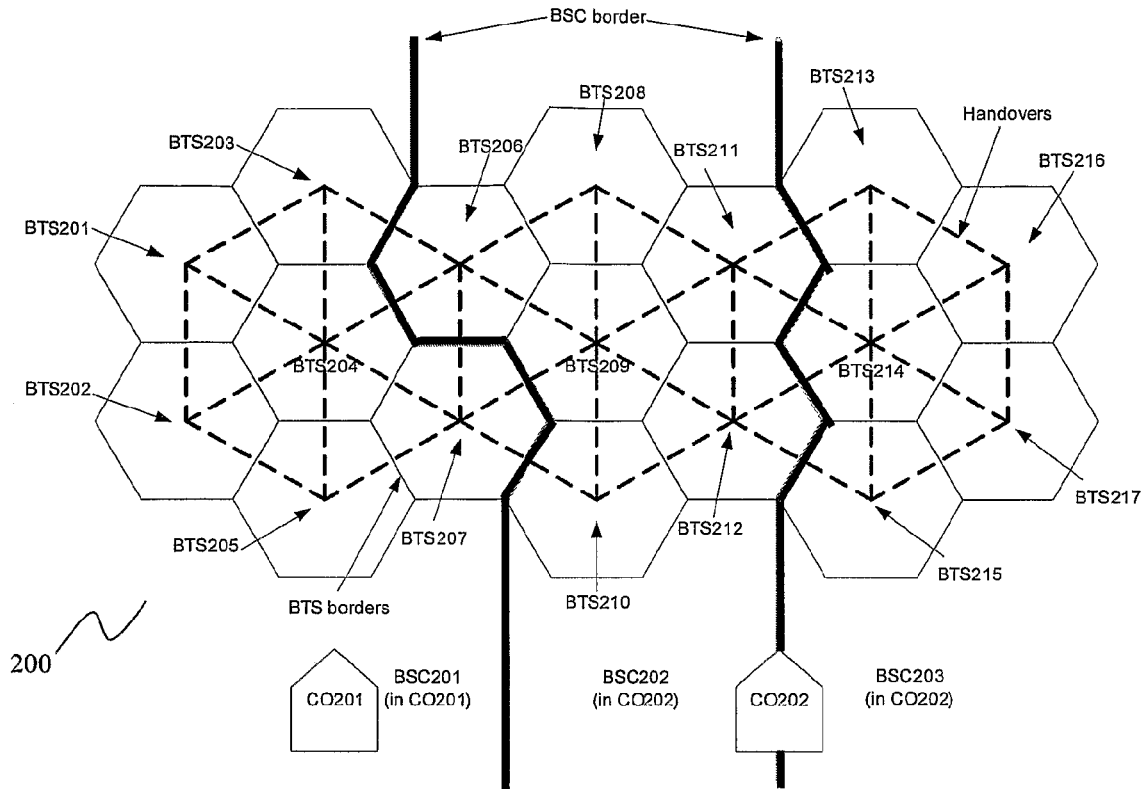

FIGS. 2 and 3 show an example of core network evolution with serving area adjustments. FIG. 2 illustrates a sample wireless network 200 with 17 BTSs (BTS201-BTS217) and 2 BSCs (BSC201, BSC202), where BSC201 controls BTS201, BTS202, BTS203, BTS204, BTS205, BTS206, BTS207 and BTS210, while BTS208, BTS209, BTS211, BTS212, BTS213, BTS214, BTS215, BTS216, and BTS217 form the serving area of BSC202. There are handovers between adjacent BTSs, and each BTS has 1 T1 for transporting the voice and data traffic to its parenting BSC. BSC201 is located in central office CO201, while BSC202 is located in a different central office CO202.

FIG. 3 shows the same network 200 as the one in FIG. 2 in terms of BTSs, with increasing traffic at each BTS. An additional BSC (BSC203) is deployed to accommodate the traffic growth. The previous BSC serving areas then need to be adjusted in order to balance the traffic among the three BSC serving areas. In this case, the serving area of BSC201 is adjusted to include BTS201, BTS202, BTS203, BTS204, BTS205 and BTS207. BSC202 controls BTS206, BTS208, BTS209, BTS210, BTS211 and BTS212. The rest of BTSs, BTS213, BTS214, BTS215, BTS216, and BTS217, in FIG. 3 are controlled by BSC203, which is located in CO202. Each BTS still has 1 T1 for transporting the traffic to its parenting BSC.

The new network configuration (three BSC serving areas vs. two in FIG. 2) in FIG. 3 introduces new BTS serving area borders, which may have an impact on network performance due to changes in the number of inter-BSC handovers (the number of handovers across BSC serving area borders) in the network. The BSC serving area changes are realized by a series of BTS re-homes (re-parenting BTSs to different BSCs). In this example, BTS206 and BTS210 are re-homed from BSC201 to BSC202, and BTS213, BTS214, BTS215, BTS216 and BTS217 are re-homed from BSC202 to BSC203. Since BSC201 is located in a different central office than BSC202 and BSC203, T1s from BTS206 and BTS210 need to be re-directed to CO202 (instead of being connected to CO201). Thus, the new network configuration requires transport facility changes. Engineering efforts are also required for the implementations of those BTS re-homes.

Figure 4:
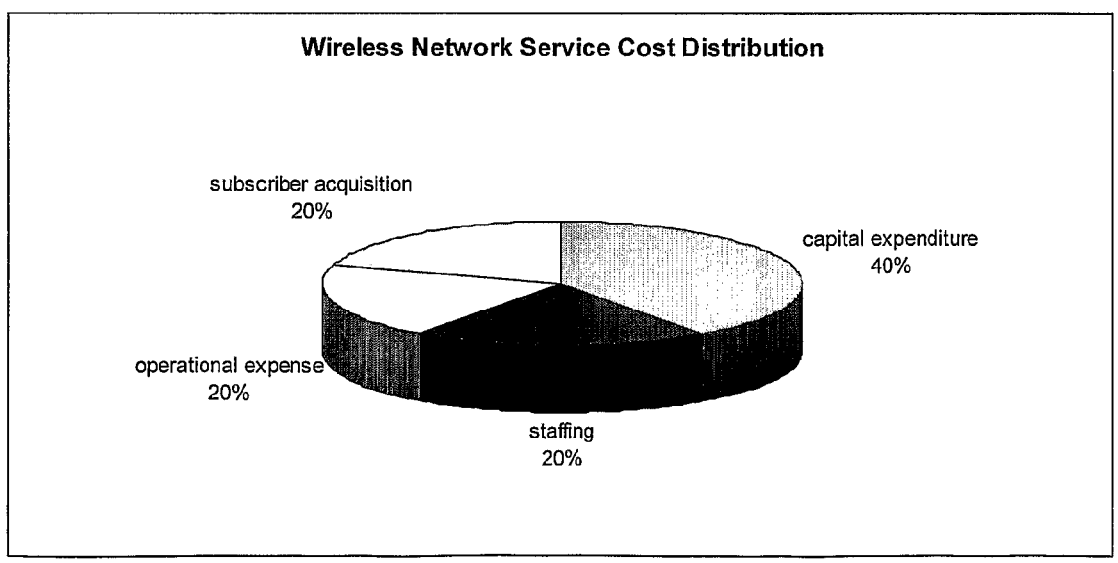
FIG. 4 is a pie chart illustrating cost distribution for providing wireless services.

The core network evolutions due to the traffic changes are always associated with cost to the service providers. FIG. 4 shows the four cost categories for providing wireless telecommunication services. In order to provide telecommunication services to subscribers, wireless service providers need to purchase and deploy network equipment, which is charged as a capital expenditure. Capital expenditure on network equipment is usually the highest cost for running a business. Service providers also spend a large amount of money on acquiring new subscribers through advertisements and handset subsidies. All the acquisition cost generally is paid back only if subscribers stay in the network for a long period of time. A high subscriber churn rate reflects high subscriber acquisition cost to the service providers. Subscriber churns are partially caused by poor network performance (e.g., call drops). Operational expense refers to any cost involving daily operations for service providers to keep the network performing at its best conditions. Operational expense includes the cost of leasing facilities, such as transport and real estate facilities. Last, but not least, service providers need to maintain a certain level of staffing in order to provide telecommunication services to its subscribers. The staff includes fulltime engineers and external contracts for maintaining and improving their wireless network infrastructures.

As shown in FIGS. 2 and 3, network evolutions involve deploying additional core network equipment, maintaining high network performance, changing the transport facility leasing, and implementing network node re-homes. Each of these efforts is associated with a cost to service providers. Deployment of additional equipment is associated with capital expenditure, maintaining high network performance helps to reduce customer acquisition and retention cost, changes in transport facilities have an impact on operational cost, and implementation of network node re-homes involves staffing cost. Thus, when optimizing wireless core networks, all costs of the different categories should be considered in order for service providers to achieve their highest profitability.

A network evolution in a certain planning period (e.g., the next M months) for a particular core network usually consists of a number of network configurations. The number of network configurations in a planning period is denoted by N in an embodiment of the present invention and is determined as discussed in detail below. The total cost of ownership for the core network over the planning period is aggregated over all the network configurations in the period, and is calculated as follows:

$$\text{Total cost of Ownership}(C_1, C_2, \ldots, C_N) = \sum_{i=1}^{N} [CoreNetworkConfigurationCost(C_i)]$$

wherein $C_i$ is a valid core network configuration during the period.

The total cost of a core network configuration consists of the following four types of cost: core network equipment cost, core network facility leasing cost, Customer Acquisition and Retention cost, and core network engineering implementation cost. The total cost of a core network configuration is calculated as follows:

$$CoreNetworkConfigurationCost(C_i) = [MonthlyEquipmentCost(C_i) + MonthlyCARCost(C_i) + MonthlyFacilityLeasingCost(C_i)] \times P_i + ImplementationCost(C_{i-1}, C_i),$$

wherein
$C_i$ is a valid network configuration; and
$P_i$ is the number of months when $C_i$ is valid.

A valid network configuration consists of a certain quantity of core network equipment, such as BSCs, RNCs, MSCs, SGSNs, and so forth. Monthly equipment cost of a core network configuration is aggregated from the monthly cost of all equipment in the network configuration. Since network equipment depreciates over time, the monthly equipment cost for a valid network configuration is calculated as follows:

$$MonthlyEquipmentCost(C_i) = \sum_{j=1}^{K} \frac{Cost(E_j(C_i))}{DepreciationMonths(E_j)}$$

wherein
K is the number of core network elements in network configuration $C_i$; and
$E_j$ is the j-th core network elements.

The monthly CAR cost is a function of subscriber churn rate. The aim of CAR spending is to keep all subscribers for a long period of time so that the revenue generated by the subscribers justifies the CAR spending. When subscriber churns occur, service providers need to spend more on CAR to get other subscribers to keep up the revenue level. The correlations between the CAR cost and subscriber churn can be modeled using statistical models based on historical relationships between CAR cost and subscriber churn over time. In addition to subscriber churns, many wireless service providers offer a certain number of free minutes for each call drop to their subscribers. Free airtime means potential revenue lost to the service providers. Thus, the CAR cost of a core network configuration is calculated as follows:

$$MonthlyCARCost(C_i) = MonthlyCARCost(SubsChurns(C_i)) + RevenueLoss(CallDrop(C_i)).$$

One of the main reasons for subscriber churns is due to poor network performance, such as call drops and deny-to-access. The correlations between subscriber churns and network performance can also be modeled using statistical models based on historical data of subscriber churns and call-drop/deny-to-access rate. Thus, the subscriber churns for a core network configuration are calculated as follows:

$$SubsChurns(C_i) = SubsChurns(CallDropRate(C_i), DenyToAccessRate(C_i)).$$

It is relatively easy to model the deny-to-access rate as a function of unsupported traffic, which is the ratio between unsupported traffic and the total traffic in the network. The call-drop rate is impacted by, among others, the number of inter-system handovers. For instance, when inter-BSC handovers occur, the handovers need to be processed by the two BSCs and the MSC to which they are connected, which makes the handover process take longer. Longer delay in handovers is more likely to cause call drops, resulting in poor network performance. The call-drop probability due to inter-system handovers depends upon the different technologies in the networks and the particular equipment deployed in the networks. The correlations between the inter-system handovers and call-drop probability are determined based on the statistics of measurement data from a particular network.

Figure 5:
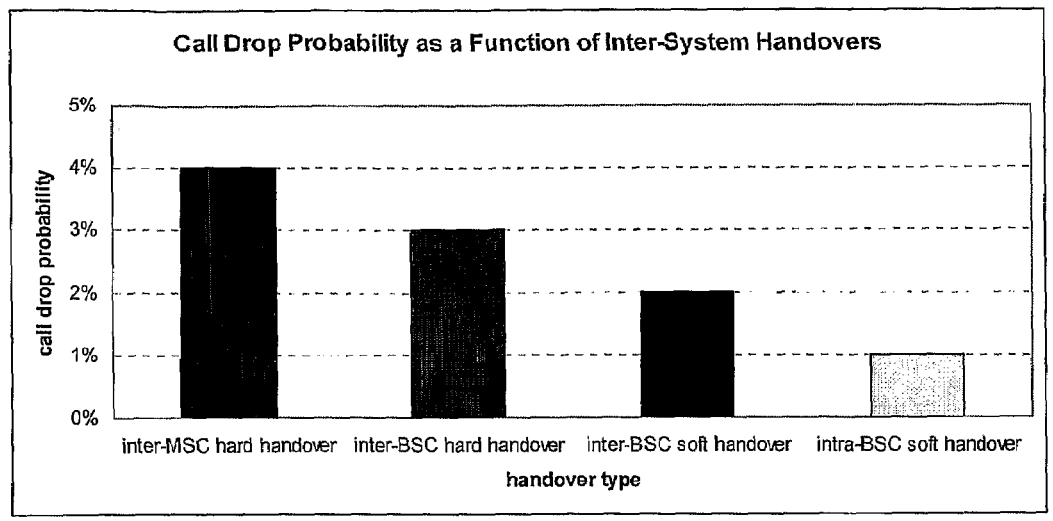
FIG. 5 is a bar graph illustrating call drop probability as a function of different types of inter-system handovers.

FIG. 5 illustrates an example of the correlation between the types of inter-system handovers and call-drop probability in a CDMA network. There are two different types of handovers between sites (BTSs) in CDMA networks: hard-handovers and soft-handovers. Hard-handovers are the handovers between two BTSs where the mobile station (MS) talks to one BTS at any given time, while soft-handovers are the ones between two or more BTSs where more than one BTS talks to the MS at the beginning of the handovers (the MS eventually talks to only one BTS after the handovers). In the particular CDMA network in FIG. 5, all handovers across MSCs are hard-handovers. FIG. 5 shows that 5% of inter-MSC handovers result in call drops in the particular CDMA network. The table in FIG. 5 can be used for modeling the call-drop probability as a function of inter-system handovers. Thus, the predicted network performance is calculated as follows:

$$CallDropRate(C_i) = \sum_i \left[ \frac{interSystemHandover(type_i)}{totalInterSystemHandovers} \times callDropProb(type_i) \right],$$

$$DenyToAccessRate(C_i) = \frac{\text{unsupported Traffic}}{\text{total Traffic}},$$

wherein $type_i$ is a type of inter-system handovers; and the summation is over all types of inter-system handovers in the network.

Thus, the monthly CAR cost of a core network configuration is calculated as follows:

MonthlyCARCost($C_i$)=$f$(unsupportedTraffic($C_i$),inter-SystemTransactions($C_i$)).

The monthly core network facility leasing cost includes the cost of transport facility leasing, real estate facility leasing, among others. Transport facilities include T1s, T3s, OC-3, OC-12, etc. Real estate facilities may include central offices. Other facilities include power and synchronization. Monthly core network facility leasing cost is calculated as follows:

$$MonthlyFacilityLeasingCost(C_i) = TransportFacilityLeasingCost(C_i) +$$
$$RealEstateFacilityLeasingCost(C_i) + OtherFacilityLeasingCost(C_i).$$

Core network engineering implementation cost includes the engineering cost of migrating to a new core network configuration from the previous one. The engineering cost consists of all costs related to the network configuration changes, including network mode re-home planning and execution cost, and network node test verification cost. The implementation cost is calculated as follows:

ImplementationCost($C_{i-1}, C_i$)=NumberOfRehomes ($C_{i-1}, C_i$)×RehomeCost.

Embodiments of the present invention may also be utilized for wireless service providers to determine an optimal core network evolution plan in a planning time period. The optimal network evolution planning minimizes the total cost of ownership, as modeled in previous paragraphs, for core network evolution over a network planning period (e.g., the next target M-month). The methods and systems recommend the amount of different types of core network equipment that needs to be deployed, when they should be deployed, and how they should be deployed in terms of network configuration and physical connectivity, in order to support the forecasted traffic, to utilize the equipment to its maximum level, to maintain high network performance level, to reduce the transport leasing cost, and to implement the network evolution with minimum efforts.

The systems and methods in preferred embodiments of the present invention determine an optimal core network evolution plan by working on different core network layers from bottom to top. For instance, in the case of a GSM/GPRS network, the systems and methods in preferred embodiments of the present invention determine an optimal core network evolution plan at the BSC level based on the predicted network traffic demands at the BTS level. After the optimal BSC level network evolution plan is determined, the systems and methods in preferred embodiments of the present invention determine an optimal MSC level network evolution plan and an optimal SGSN level network evolution plan for the planning period based on the traffic demand results from the BSC-level network evolution plan.

The systems and methods in preferred embodiments of the present invention model the different level of core networks as a number of abstract networks in mathematical terms, where a network node is modeled as a node in the network, traffic demands from the network node are modeled as node weights, a network node adjacency (between two adjacent network nodes) is modeled as an edge in the network, mobility (e.g., handovers) between adjacent network nodes is modeled as edge weight, and a serving area is modeled as a sub-network in the network. For instance, a GSM/GPRS core network at BSC level is modeled as an abstract mathematical network as follows. Each BTS in the network is modeled as a node in the network. The BTS adjacency (between two adjacent BTSs) is modeled as an edge in the network. Traffic demands from the BTSs are modeled as node weights, and handovers between adjacent BTSs are modeled as edge weights. Finally, the BSC serving areas are modeled as sub-networks in the mathematical networks.

A GSM/GPRS core network at MSC level is also modeled as a mathematical network, where BSCs are modeled as nodes, adjacent BSCs are modeled as edges, traffic demands from BSCs are modeled as node weights, handovers between adjacent BSCs are modeled as edge weights, and MSC serving areas are modeled as sub-networks in the abstract network. A GSM/GPRS core network at SGSN level is modeled as an abstract network similarly as for an MSC level network, where the only difference is that the SGSN serving areas are modeled as sub-networks. Core networks of other technologies (e.g., UMTS, and CDMA) are modeled in a similar way by a number of abstract networks, each for a core network level.

Since core networks at different levels are all modeled as abstract mathematical networks, the same methods and algorithms are applied to the abstract networks in order to determine an optimal network evolution plan at each level of core networks when working on different core network layers from bottom to top. Preferred methods and algorithms for determining an optimal network evolution plan include a multi-level serving area optimization algorithm, a core network evolution optimization algorithm, and an optimal intermediate core network configuration algorithm.

The multi-level serving area optimization algorithm defines a core network configuration with the minimal total cost of ownership based on forecasted network traffic in a particular time period (e.g., a month). The optimization algorithm determines the quantity of the core network equipment required for supporting the forecasted network traffic and the optimal network configuration along with the equipment to achieve the minimal total cost of ownership. The optimal network configuration maximizes the capacity of the core network equipment with well-balanced equipment utilization, maintains high network performance by minimizing the inter-system handovers in the network, reduces the operational cost by considering the transport cost, and limits the network engineering cost by minimizing the re-homes of network nodes.

Figure 6:
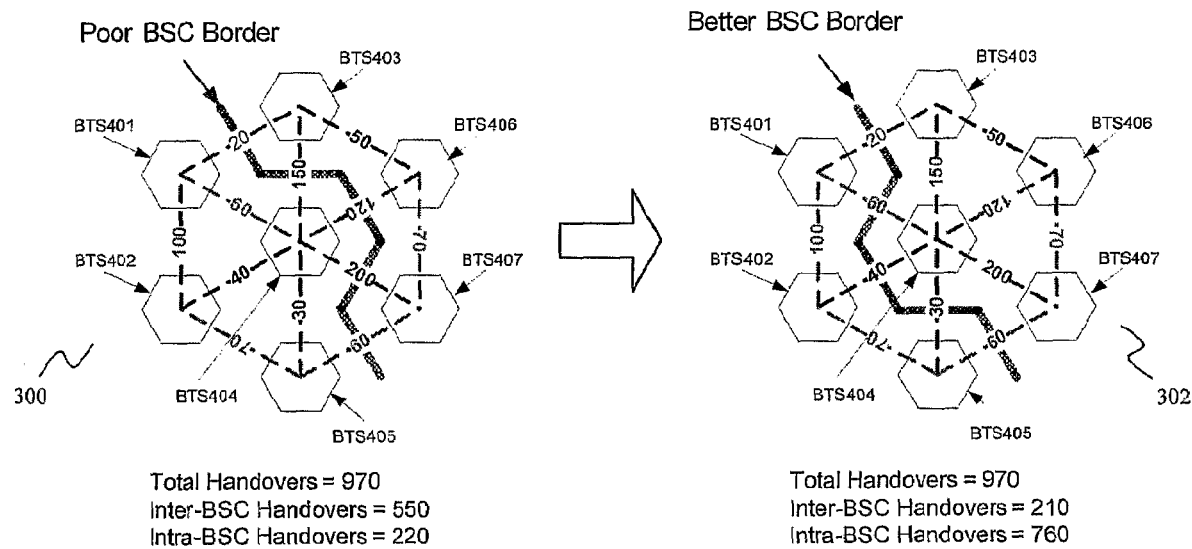
FIG. 6 is a network diagram illustrating reduction of inter-system handovers while maintaining system load balance.

When determining core network equipment serving areas, the inter-system handovers should be considered in order to maintain good network performance. The number of inter-system handovers is minimized by placing the serving area borders at the low mobility (handover) regions. FIG. 6 shows an example of how changing BSC borders can reduce the number of inter-BSC handovers while maintaining the BSC load balance. The two networks in FIG. 6 are the exactly same, and traffic at all BTSs is the same with each BTS contributing 20% of the BSC load. The network configuration 300 has BTS401, BTS402, BTS404 and BTS405 under the first BSC, and the rest of the BTSs under the second BSC, which makes the number of inter-BSC handovers equal to 550 with the two BSCs loaded at 80% and 60%. The network configuration 302 has BTS401, BTS402 and BTS405 under the first BSC, and the rest of the BTSs under the second BSC, which makes the number of inter-BSC handovers equal to 210 with the two BSCs loaded at 60% and 80%. Thus, the network configuration 302 reduces the inter-BSC handovers from 550 to 210 while the BSC load balance is maintained at 80% and 60% level.

Figure 7:
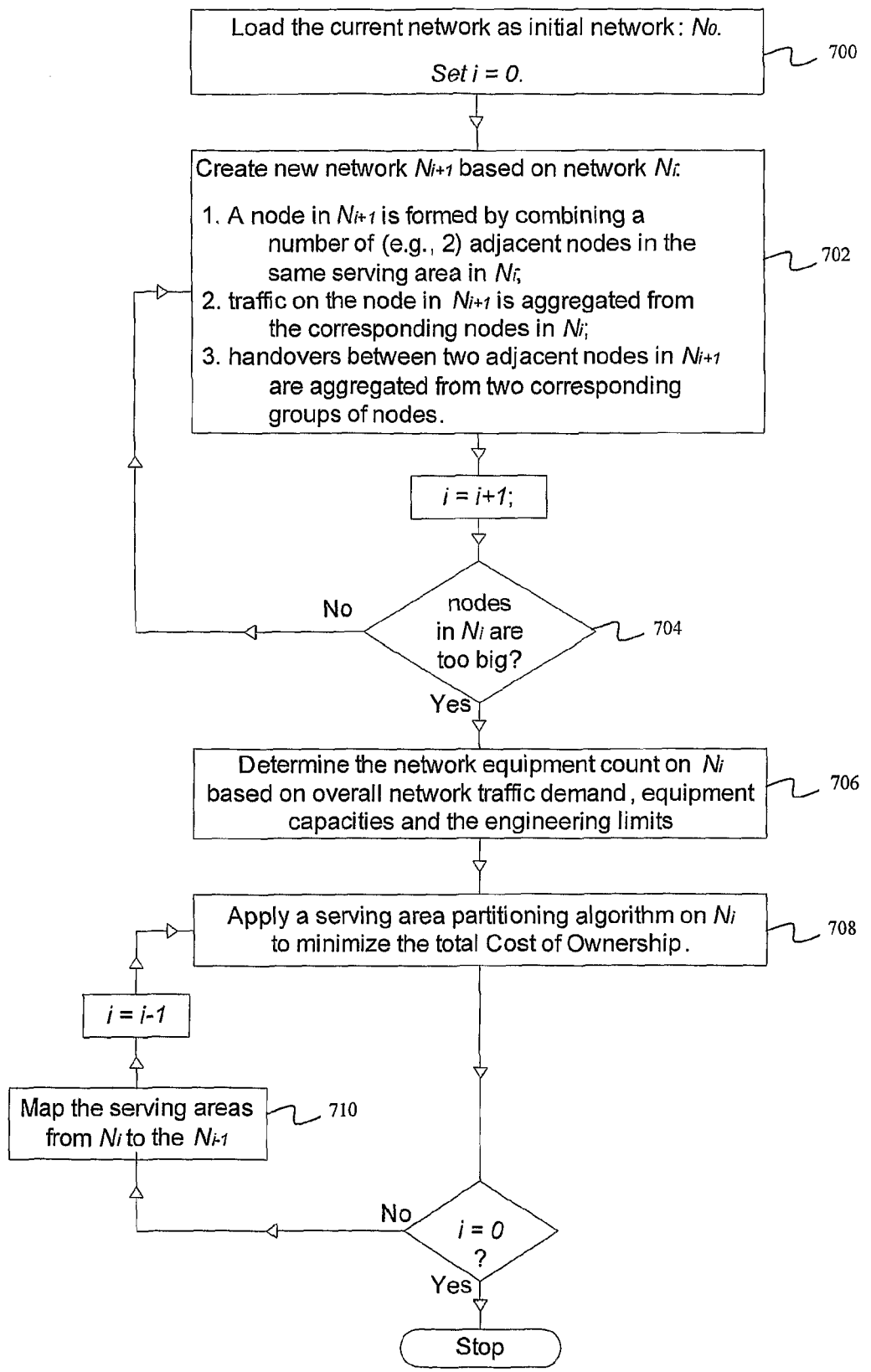
FIG. 7 is a flow chart illustrating a method of multi-level wireless network equipment serving area optimization.

FIG. 7 illustrates a flow chart of the multi-level serving area optimization algorithm. The objective of this optimization generally is to minimize the total cost of ownership of wireless core networks. As modeled in this embodiment, the optimization algorithm analyzes the four cost categories as a whole when driving down the total cost. The algorithm balances the core network equipment load for minimizing the equipment cost, reduces the inter-system handovers for improving CAR cost, re-homes network nodes for reducing transport cost, and reduces the number of network node re-homes for minimizing the network engineering cost. Alternatively, the algorithm may perform any combination of one or more of these steps. The principle methodology in the algorithm is applying a basic network partition algorithm in a series of artificial networks. Those artificial networks are generated by coarsening the network abstracted from wireless networks.

The algorithm starts with setting the wireless network for optimization as the initial network, N0, in step 700. The algorithm generates a new network, N1 based on the N0 in step 702 as follows. It combines a number of adjacent nodes in the same serving area in N0 to form a node in N1. For example, for each node in a serving area in N0, the algorithm may take its closest node and combine the two closest nodes to form a node in N1. The algorithm goes over each node in each serving area in N0 to form the nodes in N1. The algorithm then computes the traffic demand of the nodes in N1 by aggregating the traffic from the corresponding nodes in N0, and calculates the handovers between each adjacent node pair in N1 by aggregating the handovers between the two groups of nodes in N0.

After the new network N1 is generated, the algorithm checks whether the nodes in N1 are "too big" in step 704. A node being "too big" is defined as when the traffic demand on the node would post a certain fraction (e.g., ¼) of the capacity of the equipment for the serving area where the node is located. The algorithm repeats the network generation process to create new networks (N0, N1, N2, . . . , Ni) until all nodes in the last generated network, Ni, are "too big." After the network generation process in step 706, the algorithm determines the network equipment count based on overall network traffic demand, equipment capacity and the engineering limit on Ni.

With the serving areas defined in the initial configuration as a starting point, the algorithm in step 708 applies a serving area partitioning algorithm on the new network Ni to determine the optimal serving areas in Ni for minimizing the total cost of ownership. Once the optimal serving areas in Ni are determined, the algorithm maps the optimal serving areas back to the network used for generating Ni as follows. If a (super) node in Ni is in a particular serving area, all nodes used for forming that super-node will be in the same serving area. With the mapped serving areas as a starting point, the algorithm applies the serving area partitioning algorithm on the network used to form Ni for minimizing the total cost of ownership. The algorithm repeats this partitioning (step 708) and mapping (step 710) process, and stops when it reaches the initial network level.

Figure 8:
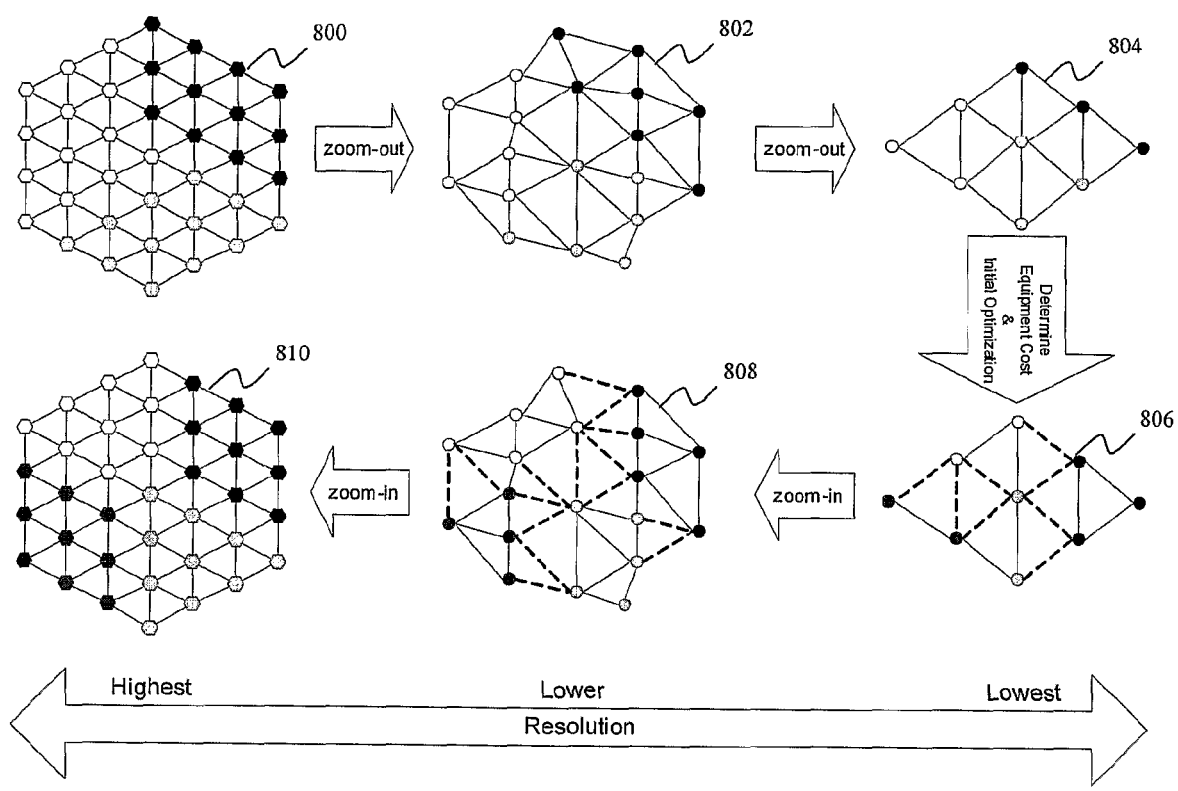
FIG. 8 is a diagram of a multi-level serving area optimization process.

FIG. 8 shows an example of how the artificial networks are generated. The network 800 in FIG. 8 is abstracted from the actual wireless network, with three serving areas. The algorithm coarsens the network by combining two neighboring nodes into a big node, to generate the network 802. When combining two neighboring nodes, the algorithm combines the two closest nodes within a serving area. The algorithm keeps coarsening the network until each serving area contains less than four big nodes. For example, the algorithm stops coarsening when it obtains the network 804 with three serving areas in FIG. 8. The algorithm then applies a network partition algorithm on the coarsest network to the optimal serving areas in the coarsest network. In FIG. 8, for example, it determines that additional equipment is needed and obtains the four optimal serving areas in the coarsest network 806.

The algorithm then reverses the coarsening process by refining the coarser network back to the finer networks 808, 810, as shown in FIG. 8. The algorithm applies the same network partition algorithm on each of the finer networks along with the network refinement process. The algorithm stops the refinement process when it reaches the initial network. In FIG. 8, for example, it stops when reaching the network 810 which is the same as the initial network 800, except that network 810 has four serving areas instead of three serving areas. The principle of the optimization algorithm is using the coarsening process to simplify the problem, and then applying the system partitioning algorithm on each network through the refining process.

The multi-level serving area optimization is used along with the total cost of ownership metric for defining optimal target M-month core network configurations. A recursive algorithm is applied to further drive down the total cost of ownership through the introduction of intermediate network configurations.

Figure 9:
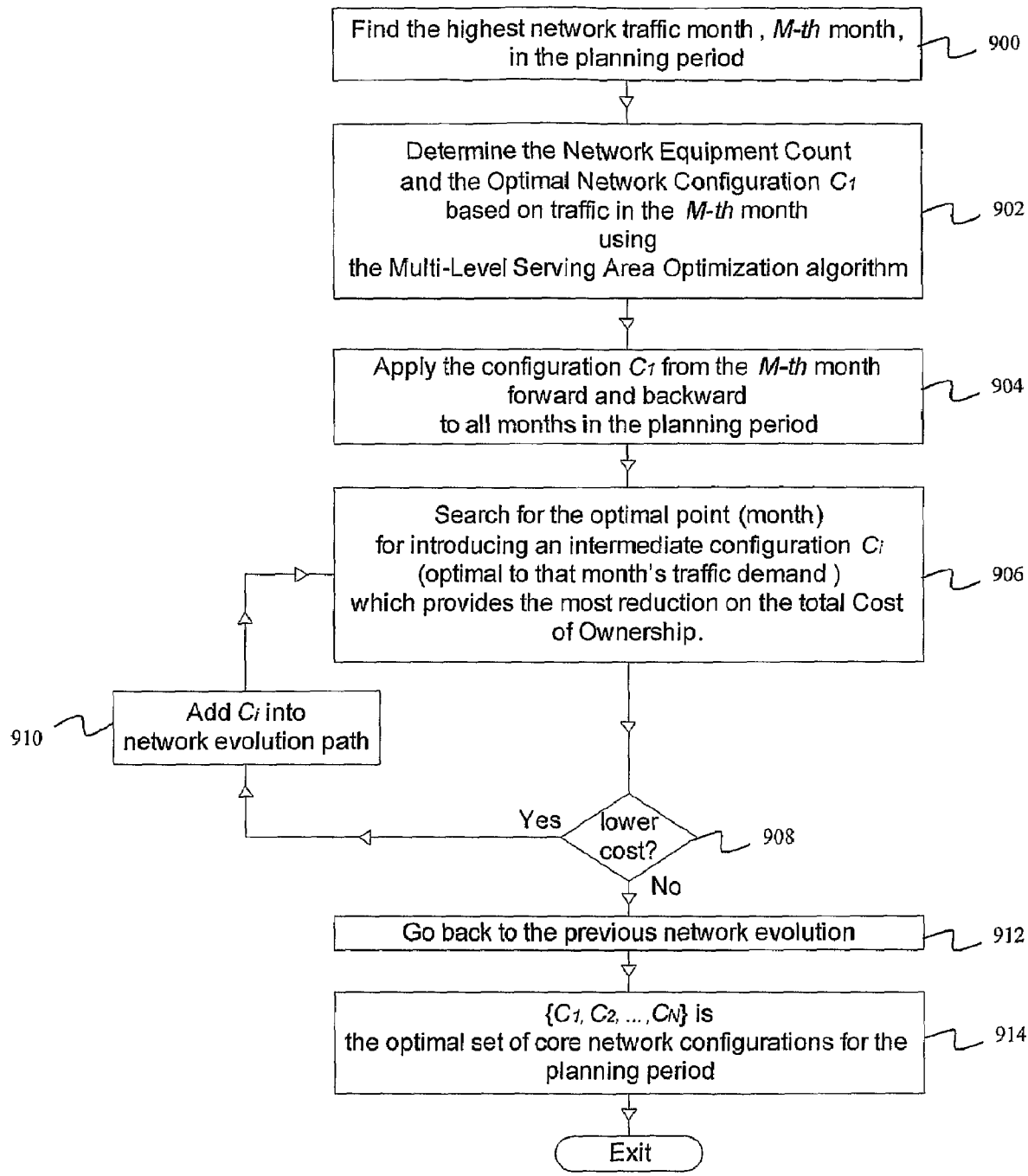
FIG. 9 is a flow chart illustrating a method of a network evolution optimization process.

FIG. 9 shows a flow chart illustrating an algorithm of network evolution optimization process. First, in step 900 the algorithm finds the highest network traffic months, denoted as M-th month, in the planning period. The algorithm in step 902 then applies the Multi-level Serving Area Optimization algorithm described in FIG. 7 based on the traffic of the M-th month in the planning period, to determine the equipment count and the optimal network configuration. The optimal network configuration of M-th month is then applied to all months in the planning period in step 904. The algorithm in step 908 then determines whether insertion of an intermediate network configuration, which is optimal to the month when it is inserted in (step 906), would provide the most reduction on the total cost of ownership assuming an insertion. If any insertion of intermediate network configuration reduces the total network cost, then the algorithm accepts the intermediate network configuration in step 910. The algorithm repeats the intermediate network configuration insertions until no insertion would reduce total network cost. The algorithm then takes the previous network evolution as the final intermediate network configuration insertion (steps 912, 914), and exits.

Figure 10A:
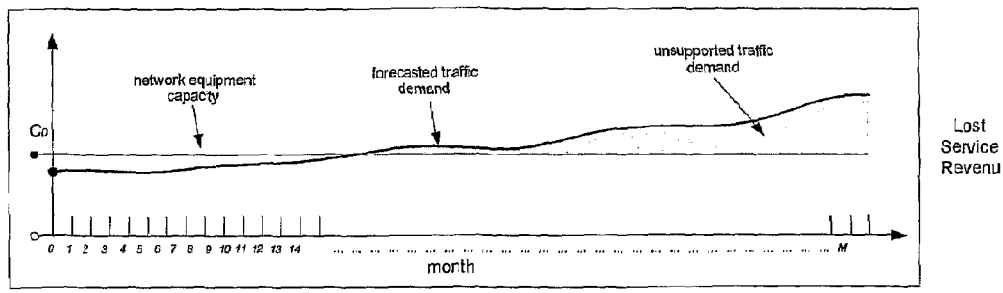
FIGS. 10a-10d are graphs showing a network evolution optimization process.
Figure 10B:
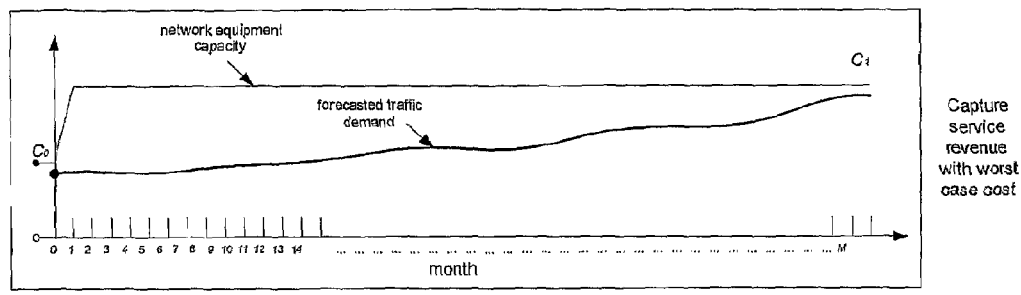
Figure 10C:
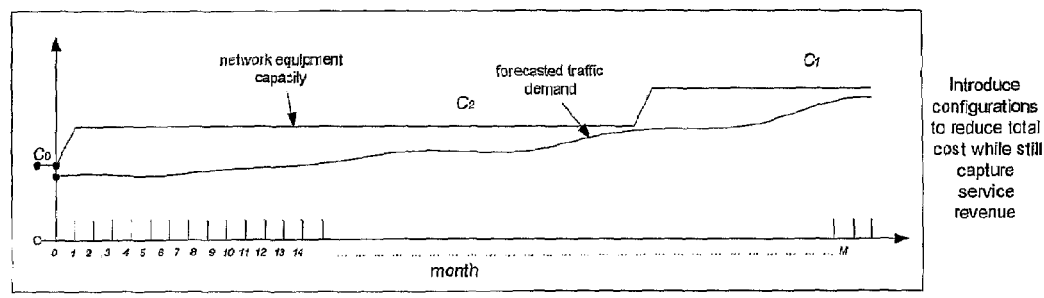
Figure 10D:
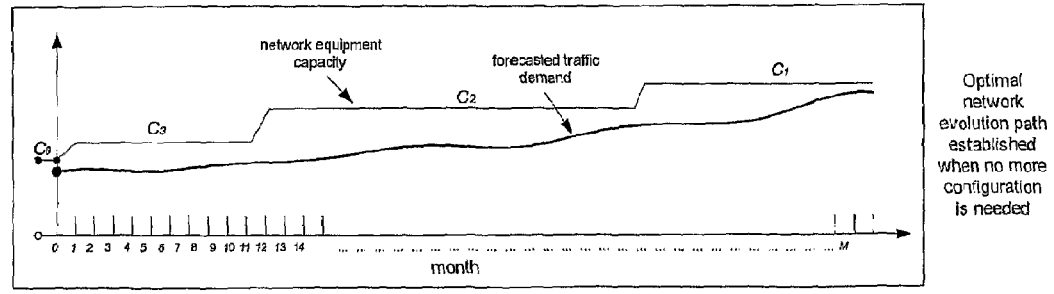

FIGS. 10a-10d are illustrations of an example showing the network evolution optimization process in accordance with an embodiment of the present invention. In FIG. 10a, the initial core network configuration ($C_0$) cannot support the forecast network traffic demand in the later months during the planning period, so more core network configurations need to be introduced. As shown in FIG. 10b, the algorithm determines the optimal core network configuration (C1) based on the forecasted traffic demand of the last month (the M-th month). It then applies the network configuration back to the first month. As shown in FIG. 10c, it computes the total cost of ownership, and finds the month to insert an intermediate network configuration C2 (optimal to that month's traffic demand using Multi-level Serving Area Optimization algorithm) which provides the most reduction in the total cost of ownership. Inserting an intermediate network configuration would reduce equipment cost due to lower equipment requirements, but increase implementation cost (more re-homes), and change the leasing cost and CAR cost. In the example shown in FIG. 10c, inserting an intermediate network configuration (C2) does reduce total cost of ownership. As shown in FIG. 10d, the algorithm repeats the insertion process, and finds the month to insert an intermediate network configuration C3 (optimal to that month's traffic demand), which provides the most reduction in the total cost of ownership. The optimal set of core network configurations are reached when no more intermediate network configurations, other than C1, C2, and C3, are needed in order to reduce total network cost.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of reducing a total cost of ownership for a wireless telecommunications core network, the method comprising:
    determining, by a computer system, an optimal core wireless network evolution plan for a network planning period;
    determining, by the computer system, an optimal core wireless network equipment count for supporting a first amount of wireless network traffic; and
    determining, by the computer system, an optimal core wireless network configuration for supporting the first amount of wireless network traffic, wherein the total cost of ownership includes capital expenditures, operational cost, customer acquisition and retention (CAR) cost, and staffing and engineering cost, and wherein the CAR cost is based on unsupported traffic and inter-system handovers.

2. The method of claim 1, wherein the capital expenditures and costs are determined using net present value or annualized payments.

3. The method of claim 1, wherein the capital expenditures for the core network include core network equipment costs.

4. The method of claim 1, wherein the operational cost for the core network includes a leasing cost of facilities.

5. The method of claim 4, wherein the facilities include transport facilities and real estate facilities.

6. The method of claim 1, further comprising:
    basing the CAR cost on statistical models of subscriber churn historical data;
    basing the subscriber churns on statistical models of deny-to-access rate and predicted call drops historical data; and
    basing the deny-to-access rate and predicted call drops on the unsupported traffic and the inter-system handovers, respectively.

7. The method of claim 1, wherein the staffing and engineering cost for the core network is based on network node re-parenting efforts involved in transactions between network configurations.

8. The method of claim 1, wherein the optimal core network evolution plan includes a plurality of core network configurations, each implemented at a particular time during the network planning period, and which together provide a lowest total cost of ownership in the network planning period.

9. The method of claim 1, further comprising a multi-level serving area optimization that determines a minimal core network equipment count for supporting predicted network traffic at any given time during the network planning period.

10. The method of claim 9, wherein the multi-level serving area optimization is based on the determined optimal core network equipment count.

11. The method of claim 8, wherein the determining the optimal core network evolution plan operates on different levels of the wireless core network in a bottom-up fashion.

12. The method of claim 11, wherein the determining the optimal core network evolution plan further comprises:
    determining a first optimal core network evolution plan at a BSC/RNC level based on predicted network traffic demands from BTS sites; and
    determining a second optimal core network evolution plan at an MSC level and at an SGSN level based on traffic demand results from the first optimal core network evolution plan.

13. The method of claim 9, wherein the multi-level serving area optimization splits the wireless core network into a number of abstract networks, each for a core network level, where a network node is a node in the abstract network, traffic demands from the network node are node weights in the abstract network, a network node adjacency between two adjacent network nodes is an edge in the abstract network, mobility between adjacent network nodes is an edge weight in the abstract network, and a serving area is a sub-network in the abstract network.

14. The method of claim 10, wherein the multi-level serving area optimization generates a sequence of network models based on the wireless core network, the optimization comprising:
    generating an network model by combining adjacent nodes in each serving area in the wireless core network;
    determining whether traffic demand on each node of the network model is over a selected fraction of a capacity of equipment for a serving area in which the node is located; and
    repeating the generating the network model and the determining the traffic demand until the traffic demand on each node is over the selected fraction.

15. The method of claim 14, wherein the multi-level serving area optimization determines the core network equipment count in a last-generated network model by adding new equipment until the average equipment utilization is within engineering limits for the network.

16. The method of claim 14, wherein the multi-level serving area optimization further comprises:
- partitioning a last-generated network model to determine a core network configuration with a plurality of serving areas;
- mapping the serving areas back to an immediately prior network model;
- partitioning the prior network model to refine the serving areas;
- repeating the mapping the serving areas and the partitioning the prior network model until the partitioning is performed on the network model abstracted from the wireless core network; and
- mapping final serving areas on the optimal network configuration.

17. The method of claim 1, wherein the determining the optimal core network evolution plan comprises determining an optimal number of core network configurations and when to deploy the configurations in the network planning period in order to minimize the total cost of ownership.

18. The method of claim 17, wherein the determining the optimal core network evolution plan comprises:
- determining a time in the planning period when the core network experiences a highest level of predicted traffic;
- applying a multi-level serving area optimization to determine a first optimal core network configuration for the highest traffic month;
- applying the first optimal core network configuration with optimal serving areas to all months in the planning period; and
- inserting intermediate core network configurations at intermediate times in the planning period by applying the multi-level serving area optimization.

19. The method of claim 1, wherein the inter-system handovers include inter-base station controller handovers.

20. The method of claim 1, wherein the inter-system handovers include inter-mobile switching center handovers.

21. The method of claim 1, wherein the inter-system handovers include inter-base station controller and inter-mobile switching center handovers.

22. A method of reducing a total cost of ownership for a wireless telecommunications core network, the method comprising:
- determining, by a computer system, an optimal core wireless network evolution plan for a network planning period;
- determining, by the computer system, an optimal core wireless network equipment count for supporting a first amount of wireless network traffic; and
- determining, by the computer system, an optimal core wireless network configuration for supporting the first amount of wireless network traffic, wherein the total cost of ownership includes capital expenditures, operational cost, customer acquisition and retention (CAR) cost, and staffing and engineering cost, and wherein the staffing and engineering cost for the core network is based on network node re-parenting efforts involved in transactions between network configurations.

23. A method of reducing a total cost of ownership for a wireless telecommunications core network, the method comprising:
- determining, by a computer system, an optimal core wireless network evolution plan for a network planning period;
- determining, by the computer system, an optimal core wireless network equipment count for supporting a first amount of wireless network traffic;
- determining, by the computer system, an optimal core wireless network configuration for supporting the first amount of wireless network traffic; and
- determining, by a multi-level serving area optimization, a minimal core network equipment count for supporting predicted network traffic at any given time during the network planning period, wherein the multi-level serving area optimization splits the wireless core network into a number of abstract networks, each for a core network level, where a network node is a node in the abstract network, traffic demands from the network node are node weights in the abstract network, a network node adjacency between two adjacent network nodes is an edge in the abstract network, mobility between adjacent network nodes is an edge weight in the abstract network, and a serving area is a sub-network in the abstract network.

24. A method of reducing a total cost of ownership for a wireless telecommunications core network, the method comprising:
- determining, by a computer system, an optimal core wireless network evolution plan for a network planning period;
- determining, by the computer system, an optimal core wireless network equipment count for supporting a first amount of wireless network traffic;
- determining, by the computer system, an optimal core wireless network configuration for supporting the first amount of wireless network traffic; and
- determining, by a multi-level serving area optimization, a minimal core network equipment count for supporting predicted network traffic at any given time during the network planning period, wherein the multi-level serving area optimization is based on the determined optimal core network equipment count, and wherein the multi-level serving area optimization generates a sequence of network models based on the wireless core network, the optimization comprising
  - (a) generating an network model by combining adjacent nodes in each serving area in the wireless core network;
  - (b) determining whether traffic demand on each node of the network model is over a selected fraction of a capacity of equipment for a serving area in which the node is located; and
  - (c) repeating the generating the network model and the determining the traffic demand until the traffic demand on each node is over the selected fraction.

* * * * *